United States Patent [19]

Montino et al.

[11] 4,025,611
[45] May 24, 1977

[54] PROCESS FOR OBTAINING HYPERFINE MAGNETITE POWDER

[75] Inventors: Franco Montino, Casale Monferrato (Alessandria); Luigi Colombo, Arona (Novara); Giuseppe Sironi, Novara, all of Italy

[73] Assignee: Montedison Fibre S.p.A., Milan, Italy

[22] Filed: Feb. 24, 1975

[21] Appl. No.: 552,604

[30] Foreign Application Priority Data

Feb. 25, 1974 Italy ................................ 48635/74

[52] U.S. Cl. ............................. 423/632; 423/152
[51] Int. Cl.² ................. C01G 49/02; C01G 49/08
[58] Field of Search .......... 423/632, 633, 634, 151, 423/152

[56] References Cited

UNITED STATES PATENTS

| 1,392,927 | 10/1921 | Fireman | 423/633 |
| 2,133,267 | 10/1938 | Ayers | 423/632 |
| 2,922,698 | 1/1960 | Moser | 423/632 |
| 3,692,683 | 9/1972 | Geus | 423/632 |
| 3,845,198 | 10/1974 | Marcot | 423/634 |

FOREIGN PATENTS OR APPLICATIONS 433,333 8/1935 United Kingdom ............... 423/632

OTHER PUBLICATIONS

Thompson, "The Reaction between Iron and Water in the Absence of Oxygen," The Electrochemical Society, Oct. 7, 1940, pp. 337–341.

*Primary Examiner*—Oscar R. Vertiz
*Assistant Examiner*—Wayne A. Langel
*Attorney, Agent, or Firm*—Stevens, Davis, Miller & Mosher

[57] ABSTRACT

A process is disclosed for producing magnetite having an equiaxial morphology in the state of a hyperfine powder, starting from a solution of a bivalent iron solution, characterized in that:

a. an aqueous suspension of $Fe(OH)_2$ is prepared by reacting an aqueous solution of a ferrous salt with alkali;

b. said aqueous suspension of $Fe(OH)_2$ is fed into an autoclave into which is also introduced a quantity of air corresponding to 4–15 normal liters per 100 g of bivalent Fe; and c. the autoclave is then brought to a temperature between 150° and 200° C and maintained at this temperature until the inside pressure has stabilized itself at a constant level, thereby bringing about the formation of the desired magnetite which, once discharged from the autoclave, is washed and dried. The aqueous suspension of $Fe(OH)_2$ subjected to thermal decomposition in the autoclave may have present therein $Cu^{++}$ ion, in a quantity between 0.3 and 1.4% by weight of the bivalent Fe. When $Cu^{++}$ is present in the aqueous suspension of $Fe(OH)_2$ which is subjected to the thermal decomposition, it is also desirable to have dissolved therein $Na_2S$ in such a quantity as to provide from 20 to 60 mg of S per 100 g of bivalent Fe.

3 Claims, No Drawings

PROCESS FOR OBTAINING HYPERFINE MAGNETITE POWDER

The present invention relates to a process for preparing hyperfine magnetite powders. More particularly, it relates to the preparation of a magnetite powder having an equiaxial morphology and an average particle diameter of around $0.1\mu$, starting from bivalent iron salts.

Bivalent iron represents at present a rather significant problem of disposal, in as much as it is the byproduct of many processing operations both chemical (for instance when manufacturing $TiO_2$ pigments from ilmenite by the sulphate process) as well as metallurgical (e.g.: the pickling of steels).

Hyperfine powders of pure magnetite may be used as a black pigment or as an intermediate for the preparation of iron reds, ferrites, iron powder, etc.

It is already well known to produce magnetite from $Fe^{++}$ by blowing air into $Fe(OH)_2$ suspensions at more or less high temperatures according to the reaction 3 $Fe(OH)_2 + 0.5\ O_2 \longrightarrow Fe_3O_4 + 3H_2O$. This technique requires rather long oxidation time as well as the use of quantities of compressed air considerably higher than the stoichiometric amount.

It is also well known to prepare magnetite from $Fe^{++}$ by thermal decomposition of $Fe(OH)_2$ in an aqueous suspension according to the reaction:

$$3\ Fe(OH)_2 \longrightarrow Fe_3O_4 + 2H_2O + H_2;$$

but this decomposition, even at temperatures around 200° C, requires several hours for completion.

Moreover, both of these methods yield coacervated magnetite powders without any control over the shape  and size of the powder particles.

Thus, the principal object of this invention is that of providing a process which, starting from solutions of bivalent iron salts, shall allow one to obtain, at relatively low reaction temperatures and with short reaction times, a morphologically equiaxial magnetite in the form of a hyperfine powder that will be essentially homogeneous from the granulometric point of view.

The foregoing and still other objects of this invention, starting from a solution of bivalent iron salts, are achieved by proceeding as follows:

- an aqueous suspension of $Fe(OH)_2$ is prepared by reacting an aqueous solution of a ferrous salt with alkali;
- said aqueous suspension of $Fe(OH)_2$ is fed into an autoclave into which is also introduced a quantity of air equal to 4–15 normal liters per 100 grams of bivalent iron;
- the autoclave is then brought up to a temperature between 150° and 200° C and maintained at such temperature until the pressure has stabilized itself at a constant level; thereby resulting in the formation of magnetite which, once removed from the autoclave, is washed and dried.

According to the present invention, it has been found that if the thermal decomposition of an aqueous suspension of ferrous hydroxide is conducted in an autoclave in the presence of catalytic quantities of air, that is, in the presence of quantities of air considerably less than the stoichiometric quantity required for the oxidation of the $Fe(OH)_2$, the reaction time, even at temperatures below 200° C, is drastically reduced and the magnetite precipitates in a much more subdivided form.

For instance, at temperatures between 150° and 200° C, and in the presence of quantities of air in the order of 1/10 of the stoichiometric quantity and with reaction times of just a few minutes, magnetite particles are obtained which have a mean diameter of around $0.1\mu$.

It has also been discovered that from a granulometric point of view the homogeneity of the powder may be still further improved if in the $Fe(OH)_2$ suspension treated in the autoclave in the manner described there is present a small quantity of $Cu^{++}$. This further feature of the invention, besides considerably improving the homogeneity of the powder (an important consideration when the magnetite is intended for use as a pigment or an intermediate for red pigments and ferrites) also contributes to an increase in the reaction rate, the reaction being completed in this case in just a few minutes.

The $Cu^{++}$ thus added for the purpose of improving the granulometric characteristics of the powder may be reduced to metallic Cu (due to the presence in the system of $H_2$) thereby causing a pollution or contamination of the magnetite, which may be undesirable. In such event (and this is still another feature of this invention) this disadvantage may be overcome by adding $Na_2S$ to the aqueous suspension of $Fe(OH)_2$, whereby the Cu remains almost completely in solution and the magnetite possesses a sufficiently high degree of purity.

In general, the $Cu^{++}$ in the aqueous suspension of $Fe(OH)_2$ will be employed in quantities between 0.3 and 1.4% of the weight of the bivalent iron, and the $Na_2S$ in such quantities as to provide 20–60 mg of S per 100 g of bivalent iron.

The addition of the $Cu^{++}$ salt may be carried out quite satisfactorily either before, during or after precipitation of the ferrous hydroxide. The important point is that the $Cu^{++}$ shall be present in the system before starting the heating of the autoclave. The same precaution applies to the $Na_2S$.

According to a preferred embodiment of this invention, a 0.5 – 1 molar $Fe(OH)_2$ suspension is prepared by dripping an aqueous solution of an alkali (preferably NaOH or $NH_3$) into an aqueous $FeSO_4$ solution, in an inert gas atmosphere and with stirring, until a pH between 9.2 and 9.5 is reached.

The $FeSO_4$ solution had previously dissolved therein a bivalent water soluble copper salt (e.g., the sulphate) in such quantities that the $Cu^{++}$ thus introduced amounted to 0.3 – 1.4% of the weight of the iron. Finally, $Na_2S$ in aqueous solution is added in such quantities as to provide 20–60 mg of S per 100 g of bivalent iron.

The aqueous suspension is then transferred into an autoclave fitted with a stirrer and a pressure gauge, and having such a capacity as to provide a free volume of from 40 to 50% over the suspension.

If desired, the preparation of the aqueous suspension may be carried out directly in the autoclave, for instance by sucking in, after establishing a vacuum and with stirring, the suitably metered reactants.

There is then introduced into the autoclave with stirring, a quantity of air equal to 4–15 normal liters per 100 g of bivalent iron, at a pressure preferably between 4 and 10 atm. Thereupon the temperature is raised to 150°–200° C. Satisfactory reaction rates are already achieved at 160° C.

The temperature is maintained constant until the pressure gauge does not indicate a further development of hydrogen. The autoclave is then brought down to room temperature, degassed, and the contents finally discharged. The magnetite product is filtered, washed with water until achieving the disappearance of the anions, and finally dried at 100° C.

The magnetite product thus obtained is in the form of particles with a mean diameter of about 0.1 which, when examined under an electron microscope, display an equiaxial morphology that is substantially cubic and substantially homogeneous from the granulometric point of view.

In comparison with the hitherto known techniques for the production of magnetite, the advantages of the process of this invention consist, amongst others, in a high reaction rate and in the fact that only small quantities of compressed air are used. The air introduced into the autoclave, upon yielding its $O_2$ to the $Fe^{++}$, will be found again at the end of the reaction in the form of $N_2$ together with the $H_2$ derived from the decomposition of the water. It is thus possible to recover an $N_2/H_2$ gas mixture which, under the preferred embodiment conditions of the invention, will show a volumetric ratio of about 1:1, and may be used for producing a part of the $NH_3$ necessary for precipitating the $Fe^{++}$ as $Fe(OH)_2$ (there would be a backflow or return of about 1/10 of the necessary $H_2$ and of about ¼ of the necessary $N_2$).

Other characteristics and other advantages of the process of this invention will be made even more clearly understood from a consideration of the following detailed working example:

EXAMPLE

In 876.5 g of an aqueous solution of $FeSO_4$, having a volume of about 760 cc (Stabilized with a few drops of concentrated $H_2SO_4$), and containing 50 g of $Fe^{++}$, were dissolved 1.08 g of $CuSO_4 \cdot 5H_2O$ (equivalent to 0.275 g of $Cu^{++}$).

The solution thus prepared was sucked into a previously evacuated 2-liter autoclave.

After starting the stirring, there were then sucked into the autoclave 165 cc of an aqueous solution of 14.8 molar $NH_3$ necessary for obtaining the desired suspension of $Fe(OH)_2$ at a pH of 9.4. In the ammonia solution there had previously been dissolved 100 mg of $Na_2S \cdot 9H_2O$ (13 mg of S).

Once the introduction of the $NH_3$ has been accomplished, the autoclave was then fed with air to a pressure of 6 atmospheres and the temperature was brought up to 160° C in 1 hour. After 5 minutes the pressure stabilized itself at 19.5 atm.

The autoclave was then cooled down to room temperature, the pressure of $H_2 + N_2$ was bled off, and the magnetite suspension was discharged from the autoclave. The suspension was then filtered (the mother liquor was of an intensely blue color because because of the presence of $Cu^{++}$ in an ammonia solution), and the powder was washed until disappearance of the $SO_4^{--}$, and finally dried at 100° C.

Under the electron microscope, the magnetite particles thus obtained showed a cubical morphology. The particles showed to an extent of 80% diameters between 0.05 and 0.15 $\mu$.

The magnetite product thus obtained contained 0.045% by weight of Cu, a quantity that is considerably less than the theoretical content of Cu introduced (0.40% by weight).

What is claimed is:

1. A process for producing magnetite having an equiaxial morphology in the state of a hyperfine powder, starting from an aqueous suspension of $Fe(OH)_2$ prepared by reacting an aqueous solution of a ferrous salt with alkali, characterized in that:
   a. said aqueous suspension of $Fe(OH)_2$ is fed into an autoclave into which is also introduced a quantity of air corresponding to 4–15 normal liters per 100 g of bivalent Fe; and
   b. the autoclave is then brought to a temperature between 150° and 200° C and maintained at this temperature, in the presence of $Cu^{++}$ ion in a quantity between 0.3 and 1.4% by weight of the bivalent Fe, until the inside pressure has stabilized itself at a constant level, thereby bringing about the formation of magnetite having a mean diameter of about 0.1$\mu$ which is removed from the autoclave, and then washed and dried.

2. A process according to claim 1, wherein the aqueous suspension of $Fe(OH)_2$ is subjected in the autoclave to thermal decomposition in the presence of dissolved $Na_2S$ in such a quantity as to provide from 20 to 60 mg of S per 100 g of bivalent Fe.

3. A process according to claim 1, wherein air is introduced into the autoclave at a pressure between 4 and 10 atm.

* * * * *